United States Patent [19]
Goedecke et al.

[11] Patent Number: 5,244,242
[45] Date of Patent: Sep. 14, 1993

[54] MANIPULATOR WITH A SUCTION GRIPPER AND METHOD FOR HANDLING AND TESTING FLUID-PASSING COMPONENTS

[75] Inventors: Wolf-Dieter Goedecke, Unterkirnach; Victor Cohanciuc, Villingen-Schwenningen, both of Fed. Rep. of Germany

[73] Assignee: Mannesmann Aktiengesellschaft, Düsseldorf, Fed. Rep. of Germany

[21] Appl. No.: 644,991

[22] Filed: Jan. 23, 1991

[30] Foreign Application Priority Data

Jan. 24, 1990 [DE] Fed. Rep. of Germany ....... 4001937

[51] Int. Cl.⁵ .......................... B25J 15/06; B66C 1/02
[52] U.S. Cl. .................................. 294/64.2; 294/64.1; 294/907; 901/40
[58] Field of Search ................. 294/64.1, 64.2, 65, 294/907; 29/743; 269/21; 414/627, 737, 752; 901/40

[56] References Cited

U.S. PATENT DOCUMENTS

| | | | |
|---|---|---|---|
| 3,219,380 | 11/1965 | Carliss | 294/64.1 |
| 4,088,312 | 5/1978 | Froach et al. | 294/65 X |
| 4,117,648 | 10/1978 | Goodman | 294/65 X |
| 4,266,905 | 5/1981 | Birk et al. | 294/64.1 X |
| 4,432,701 | 2/1984 | Ise | 294/64.2 X |
| 4,750,768 | 6/1988 | Kumar | 294/64.1 |
| 4,865,521 | 9/1989 | Ise et al. | 294/64.2 X |
| 4,925,225 | 5/1990 | Dost | 294/64.1 |
| 5,059,088 | 10/1991 | Klein | 294/64.1 X |

FOREIGN PATENT DOCUMENTS

| | | | |
|---|---|---|---|
| 2250928 | 4/1974 | Fed. Rep. of Germany | 294/64.1 |
| 624860 | 9/1978 | U.S.S.R. | 294/64.2 |
| 2207413 | 2/1989 | United Kingdom | 294/65 |

Primary Examiner—Johnny D. Cherry
Attorney, Agent, or Firm—Horst M. Kasper

[57] ABSTRACT

A manipulating device includes a gripper (11) for gripping workpieces (19) by way of a negative pressure. A suction pump for generating and feeding the negative pressure as well as at least one valve (24) are disposed in a casing (14). The casing is connected with the suction gripper (11). The negative pressure can be applied to the suction gripper (11) by means of the valve (24).

28 Claims, 5 Drawing Sheets

MANIPULATOR WITH A SUCTION GRIPPER AND METHOD FOR HANDLING AND TESTING FLUID-PASSING COMPONENTS

BACKGROUND OF THE INVENTION

1. Field of the Invention

The invention relates to a manipulating device with a suction gripper for gripping of workpieces by way of negative pressure, where means for generating or feeding of a negative pressure, as well as at least one valve, are disposed in a casing connected to the suction gripper, and where the suction gripper can be subjected to the negative pressure based on these means, as well as a method for the manipulation and testing of components passed by fluids, where the component is gripped with a suction gripper based on negative pressure.

2. Brief Description of the Background of the Invention Including Prior Art

A handling device as well as a method of the kind recited above are known in the manipulating technology.

Workpieces or components are gripped, and moved and/or manipulated by way of grippers according to the manipulating technology, where the grippers are disposed at so-called linear shafts or rotary shafts. It is possible in this manner that the workpieces or components are transported from one first defined point to a second defined point and at the same time possibly also oriented by rotation or the like. Furthermore, it is possible, for example, to bring different components together for the assembly of workpieces and then to connect the components in that, for example, screws are screwed into corresponding threaded boreholes, in that components of a workpiece are plugged together, or in that electrical or electronical components, respectively, are inserted with their connectors in prepared boreholes of a printed circuit board.

It is known in this context that, for the gripping of workpieces or components, some are to be gripped by providing a force-matching connection or a shape-matching connection. In special application cases, in particular where larger workpieces or components with flat and smooth surfaces are present, it is further known to employ a suction gripper for the gripping of the workpieces. In this context, a suction gripper is considered to be a component, shaped like a calotte shell and made of rubber or an elastic synthetic material, disposed at an end of an arm. Said component is placed like a sucker on the smooth and flat surface of the workpiece or of the device component in order to allow an evacuation of the inner chamber of the sucker via a negative pressure conduit. The workpiece or the component is retained in this manner by way of negative pressure and it can be transported and/or rotated. If the workpiece or the device component is to be released, then either the negative pressure under the suction gripper is replaced by ambient pressure or an overpressure is even fed under the suction gripper for a short time to achieve an accelerated release.

In known manipulating devices, the suction grippers have large volumes and are consequently unsuitable for the manipulation of smaller workpieces and components, in particular in cases where further aggregates are disposed in the immediate proximity of the manipulating device. Known manipulating devices are limited in their functioning to transport, to orient, or to assemble the workpieces or device components in the recited manner.

SUMMARY OF THE INVENTION

1. Purposes of the Invention

It is an object of the invention to provide an improved manipulating device which, due to its extremely compact set-up, allows a disposition of a manipulating device with a suction gripper in a very small space, such that further aggregates can be disposed in the immediate proximity of the manipulating device.

It is another object of the invention to provide an improved method which allows to grip device components by way of negative pressure with a suction gripper, where the components are to be tested with respect to fluid passage.

It is yet a further object of the invention not to limit the functioning of the manipulating device to only a transporting, a manipulating, or an assembly of the workpieces or of the device components.

These and other objects and advantages of the present invention will become evident from the description which follows.

2. Brief Description of the Invention

The present invention provides for a manipulating device including a suction gripper for gripping workpieces with a negative pressure. A disk-shaped casing is connected to the suction gripper and includes a broad side. A means for generating and feeding a negative pressure is disposed in the casing. At least one valve is disposed in the casing. The suction gripper is subjected to the negative pressure by means of the valve. An integrated channel system is disposed in the casing and a distribution channel disposed in the channel system. The distribution channel is led to the broad side of the casing such that the casing is assembled with additional casings to form a valve battery block. The distribution channels of the casings abut and join together, and the channel systems communicate with each other.

A second valve and a window-like breakout section can be provided at the casing. The valves can be disposed in the window-like break-out section of the casing. Means can be provided for setting the negative pressure. A pressure sensor can be disposed at the casing. The pressure sensor can be connected to a rigid conduit carrying the negative pressure and leading to the suction gripper. The pressure sensor can be connected to an automatic controller for setting the negative pressure. The valve, by way of which the suction gripper is subjected to a negative pressure, can be a servo valve. A Venturi nozzle can include a pressure connection and a suction connection and can be at the casing. The pressure connection of the Venturi nozzle can be connected to the distribution channel subjected to compressed air via the valve. The suction connection of the Venturi nozzle can be connected to the suction gripper. A negative-pressure connector can be disposed at the casing and can be connected via the valve to the suction gripper.

A method for manipulating and testing of fluid-passing device components, can comprise the following steps. A device component is gripped with a suction gripper by way of a negative pressure. The suction gripper is placed at a first passage-flow opening of the device component. The pressure is measured in a conduit of the suction gripper guiding the negative pressure.

According to the invention, the manipulating device includes a disk-shaped casing and is furnished with an integrated channel system. The channel system includes a distribution channel, which is led into a surface of the casing. Thereby the casing can be assembled with additional casings to form a valve battery block. The distribution channels of the casings meet and join, and the channel systems communicate with each other at the valve battery block.

In accordance with the invention, the suction gripper is attached to a passage-flow opening of the device component and the pressure is measured in the negative-pressure-conducting conduit of the suction gripper.

By integration of the pneumatic device components, required for the generation of negative pressure or of negative pressure distribution, respectively, into a disk-shaped casing, it is possible in an advantageous way to obtain block arrangements, where the negative-pressure functions for controlling the suction gripper are disposed only within one disk of the block. Further functions of the manipulating device, for example, the control of linear shafts or rotary shafts, of short-stroke grippers or the like, can then be controlled in an advantageous manner by the further disks of the block. The wiring or, respectively, tubing-laying expenditures are minimized in this context because a passing-through channel system is generated based on the adjacent and joining dispositioning of the disks of the block. Thereby the required negative pressures and overpressures can be made available by a joint connection for all disks of the block unless, for example, a negative pressure is generated by suitable means within the disk of the block itself, furnished for the negative pressure generation, by way of over-pressure actuated device components. Based on this integrated channel system, it is furthermore possible to subject the respective disk of the block to different supply pressures by control from the outside.

Furthermore, simultaneously with the manipulation of the workpiece, a testing of the workpiece can in some cases be performed based on the capturing and determining of the negative pressure active and effective at the suction gripper. This holds in such cases, where there is present a workpiece which, during operation, is itself to be passed by a fluid medium, such as is the case for example in connection with filters, nozzles, and the like. If in this case, according to the invention, the suction gripper engages at a surface of the workpiece, in which the passage flow opening of the workpiece is disposed, be it either an inlet or an outlet opening, then a certain pressure loss occurs under the suction gripper since the workpiece is passed by an airflow based on the effective negative pressure. If the resulting pressure change is now measured at the negative pressure conduit, then this is a criterium and a parameter relating to the question of whether the manipulated device element corresponds with respect to its function to a predetermined specification.

Consequently, substantial amounts of time can be saved, if the operating procedures of manipulation and of fluidic testing are performed simultaneously.

According to a preferred embodiment of the invention manipulating device, the casing is furnished with a window-shaped breakout section, in which the valves are disposed.

This feature is associated with the advantage that the casing comprises, on the one hand, a massive, solid region, in which the channel system is disposed, whereas, on the other hand, there is furnished space and room for the required device components in the window-like breakout or opening section. Based on this construction, the device components can be mounted and assembled in a simple way and can also, if desired, be removed for servicing and repair work.

According to a preferred embodiment, there are furnished means for a setting of the level value of the negative pressure.

This feature is associated with the advantage that the negative pressure, regulated or automatically controlled, can be prespecified over a wide range or can possibly be adjusted. For example, in the manipulation of heavy objects, a higher negative pressure can be set or, respectively, an insufficient negative pressure can be increased. In connection with the manipulation of lightweight objects, for example of paper sheets, a lower negative pressure can be set or, respectively, a negative pressure which is too high can be decreased. The negative pressure can in this context be set by programming.

According to a further preferred embodiment, the casing comprises a pressure sensor, which is connected to a negative pressure conduit running to the suction gripper.

This feature is associated with the advantage that the function of the suction gripper can be monitored in a simple way in that, for example, a threshold stage as well as a display element are connected to the pressure sensor. If the suction gripper does then no longer engage properly and precisely at the workpiece or the device component, then no sufficient negative pressure can be formed below the suction gripper, because for example leakage air flows to the underside of the suction gripper. In this case, the pressure sensor, contained in the casing, would measure only a small negative pressure value and the display means could be controlled via the threshold stage, in order to display an erroneous and faulty functioning of the manipulating device.

It is particularly preferred in connection with this embodiment if the pressure sensor is connected to an automatic controller for the setting of the negative pressure.

This feature is associated with the advantage that, independent of the variations of the operating conditions, for example, independent of the surface roughness of the workpiece to be gripped and thus variations of the leakage air flowing under the suction gripper, it is possible to set always the same negative pressure because, in case of rougher surfaces or higher leakage rates, respectively, a correspondingly higher suction power can be connected to the negative pressure conduit based on an adjustment of the automatic controller.

According to a group of exemplified embodiments, the valve, by way of which the suction gripper is subjected to the negative pressure, can be furnished as a servo valve.

This construction provides the advantage that a certain output pressure can be maintained constant based on an internal control circuit integrated in such a valve. The size of the output pressure is additionally fixed by external switching measures.

According to a group of exemplified embodiments, the casing comprises a Venturi nozzle. The pressure connection of the Venturi nozzle can be connected to the distribution channel subjected to the compressed air via a valve. The suction connection of the Venturi nozzle is in connection with the suction gripper.

This construction furnishes the advantage that the negative pressure, required for the actuation of the suction gripper, can be generated in the disk-shaped casing itself by way of an overpressure. The overpressure is present anyway for other purposes and tasks of neighboring disks of the block such that a separate feeding of a negative pressure is not required.

According to a further group of exemplified embodiments, the casing includes a negative-pressure connection, which is connected via a valve with the suction gripper.

As already recited, this feature is associated with the disadvantage that an external negative pressure connection is required. On the other hand, there results the advantage that no particular steps have to be undertaken in order to treat the air, flowing out from a Venturi nozzle, with a sound-absorbing means or to collect and to discharge said air.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention.

DESCRIPTION OF INVENTION AND PREFERRED EMBODIMENT

According to the present invention, there is provided a manipulating device with a suction gripper 11 for a gripping of workpieces 19 with negative pressure. A means for generating or feeding a negative pressure and at least one valve 24 are disposed in a casing connected to the suction gripper 11. The suction gripper 11 is subjected to the negative pressure by means of the valve 24. The casing 14 is of a disk-shaped form and is furnished with an integrated channel system 21. The channel system 21 exhibits a distribution channel 22. Said distribution channel 22 is led to a broad side 17 of the casing 14 such that the casing 14 together with additional casings 14', 14", 14''' can be assembled to form a valve battery block. The distribution channels 22 of the casing 14, 14', 14", 14''' abut and join together. The channel systems 21 communicate with each other.

The casing 14 can exhibit a window-like breakout section 23. The valves 24, 25 can be disposed in said window-like break-out section 23. Means can be provided for setting the negative pressure. The casing 14 can comprise a pressure sensor 26. Said pressure sensor 26 can be connected to a rigid conduit 12, carrying the negative pressure and leading to the suction gripper 11. The pressure sensor 26 can be connected to an automatic controller for a setting of the negative pressure.

The valve, by way of which the suction gripper is subjected to a negative pressure is a servo valve 81.

The casing 14 can comprise a Venturi nozzle 40. The pressure connection of the Venturi nozzle can be connected to the distribution channel 22 and can be subjected to the compressed air via the valve 24. The suction connection of the Venturi nozzle 40 can be connected to the suction gripper.

Figure 3:
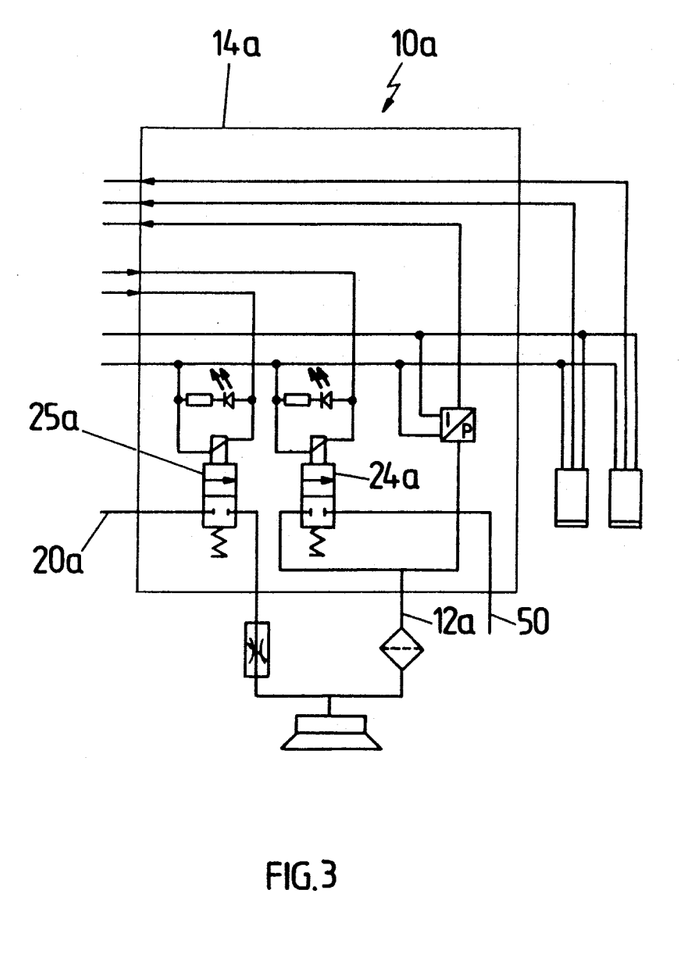
FIG. 3 is a second embodiment of a circuit diagram similar to that of FIG. 2.

The casing 14a of FIG. 3 can exhibit a negative-pressure connector 50. Said negative-pressure connector 50 can be connected via a valve 24a to the suction gripper 11.

Figure 1:
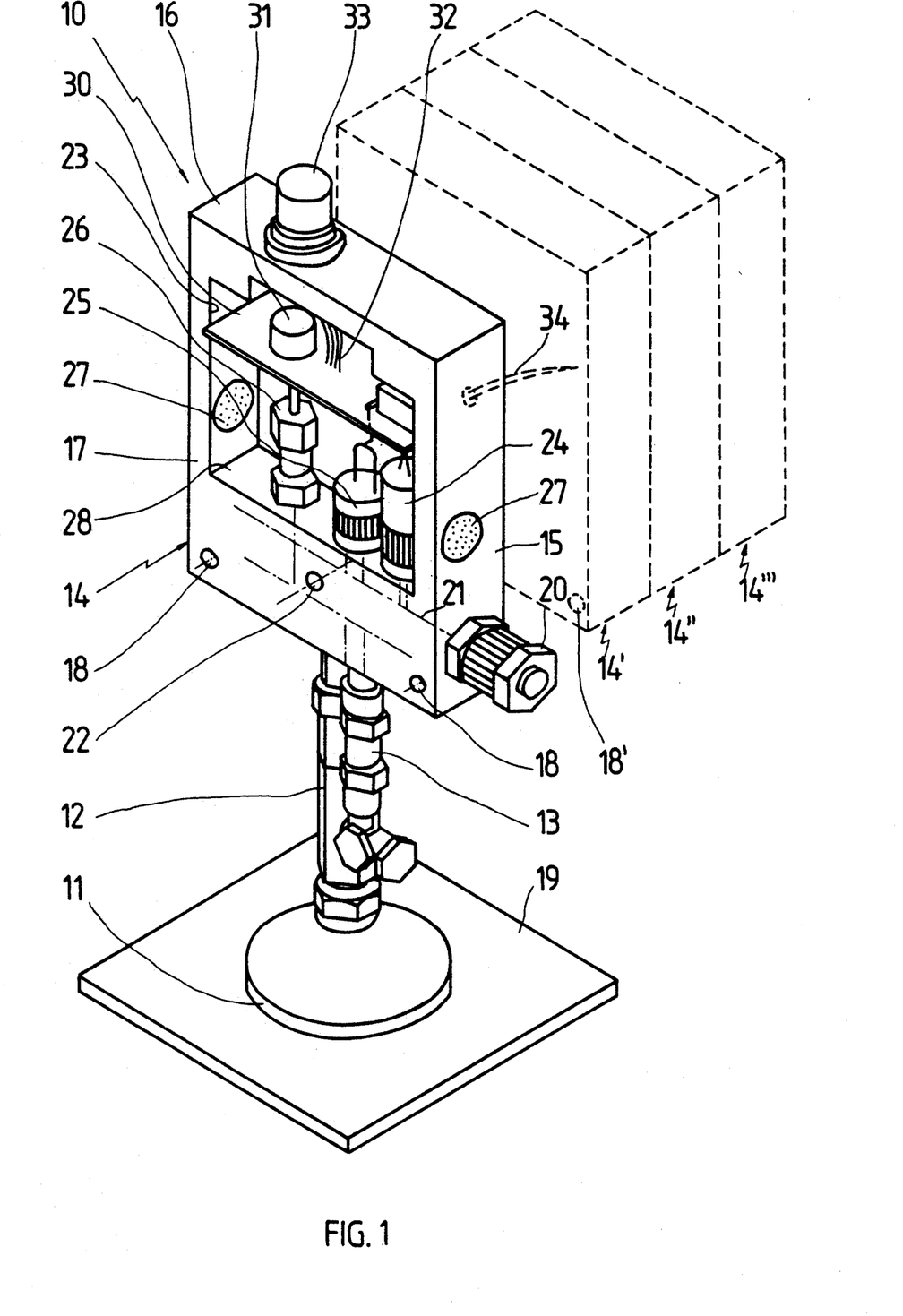
FIGS. 1 and 6 are perspective views of an exemplified embodiment of the invention manipulator.

A negative-pressure battery 10 is illustrated in FIG. 1 as it is to be employed in a modular manipulating device.

The negative-pressure battery 10 comprises a suction gripper 11, which is connected via a first, rigid conduit 12 as well as via a second, flexible conduit 13 to a casing 14. The casing 14 exhibits lateral narrow sides 15, upper and lower narrow sides 16, as well as broad sides 17. The casing 14 thus has a disk-shaped form.

The lateral narrow sides 15 and the upper and lower narrow sides 16 have in general the same width. The disks are preferably more or less quadratic, i.e. the horizontal and vertical dimensions do not differentiate by more than about 20%. The width and the height of the disk can be from about 2 to 10 times, and is preferably from about 3 to 5 times, the thickness of the disk.

Attachment boreholes 18 are indicated in the broad sides 17 in order to illustrate that the casing 14 can be combined to a block with additional casings 14', 14", and 14'''. A solenoid valve battery block of this kind is taught in the German Patent Application P 3,917,242.2 of the applicant, and where the disclosure contents of said application is cited by reference to be part of the disclosure content of this application.

The suction gripper 11 is essentially comprised of a calotte-shell-shaped device element made of rubber or an elastic synthetic material which can be placed like a sucker onto a workpiece 19 or a device component. A negative pressure can now be generated under the suction gripper 11 via the first, rigid conduit 12 such that the workpiece 19 can be suctioned and retained by way of the negative pressure. The negative-pressure battery 10 is a component of a manipulating system, i.e. it is disposed at a linear shaft or a rotary shaft or a combination of a linear and/or rotary shaft such that the negative-pressure battery 10, together with the gripped workpiece 19, can be moved along any desired coordinate direction in a space in order to perform transport and assembly procedures. The first, rigid conduit 12 thereby assumes simultaneously the mechanical support of the workpiece 19.

A central compressed-air connector 20, illustrated in FIG. 1, cooperates with a channel system 21. The channel system 21 is preferably formed in a massively and solidly formed section of the casing 14 by corresponding boreholes. While this channel system 21 runs substantially in a direction between the lateral narrow sides 15, a distribution channel 22 extends in a direction perpendicular thereto and thereby also perpendicular to the broad sides 17. The distribution channel 22 branches lead to and join into corresponding openings in the broad sides 17. If several casings 14, 14', 14", and 14''' are screwed together by way of the attachment boreholes 18, then the openings of the distribution channels 22 are disposed on top of each other. Thereby, a communicating channel system is generated which passes through all casings 14, 14', 14", and 14'". Said communicating channel system can centrally be subjected to compressed air from the compressed-air connector 20. It is of course possible in a corresponding way to furnish several channel systems for different overpressure values or for overpressure values as well as negative-pressure values or for the exhaust air from valves or the like.

A window-like breakout section 23 is furnished in the otherwise massive and solid casing 14. Pneumatic device components, i.e. valves 24, 25 as well as a pressure sensor 26, are disposed in the window-like breakout section 23. In addition, sound absorbers 27 run from the window-like breakout section 23 through the lateral narrow sides 15 outwardly in order to allow exhaust air to flow off and discharge under low noise conditions. Said exhaust air discharges from the pneumatic device elements 24, 25, 26 into the space formed by the window-like breakout section 23.

The pneumatic device elements 24, 25, 26 are preferably formed as screw-in device elements, which are screwed into a surface 28 of the window-like breakout section 23 and which are connected from there with the channel system 21, as is indicated in FIG. 1 with dash-dotted lines. The corresponding holds for the connection of the conduits 12 and 13.

Figure 5:
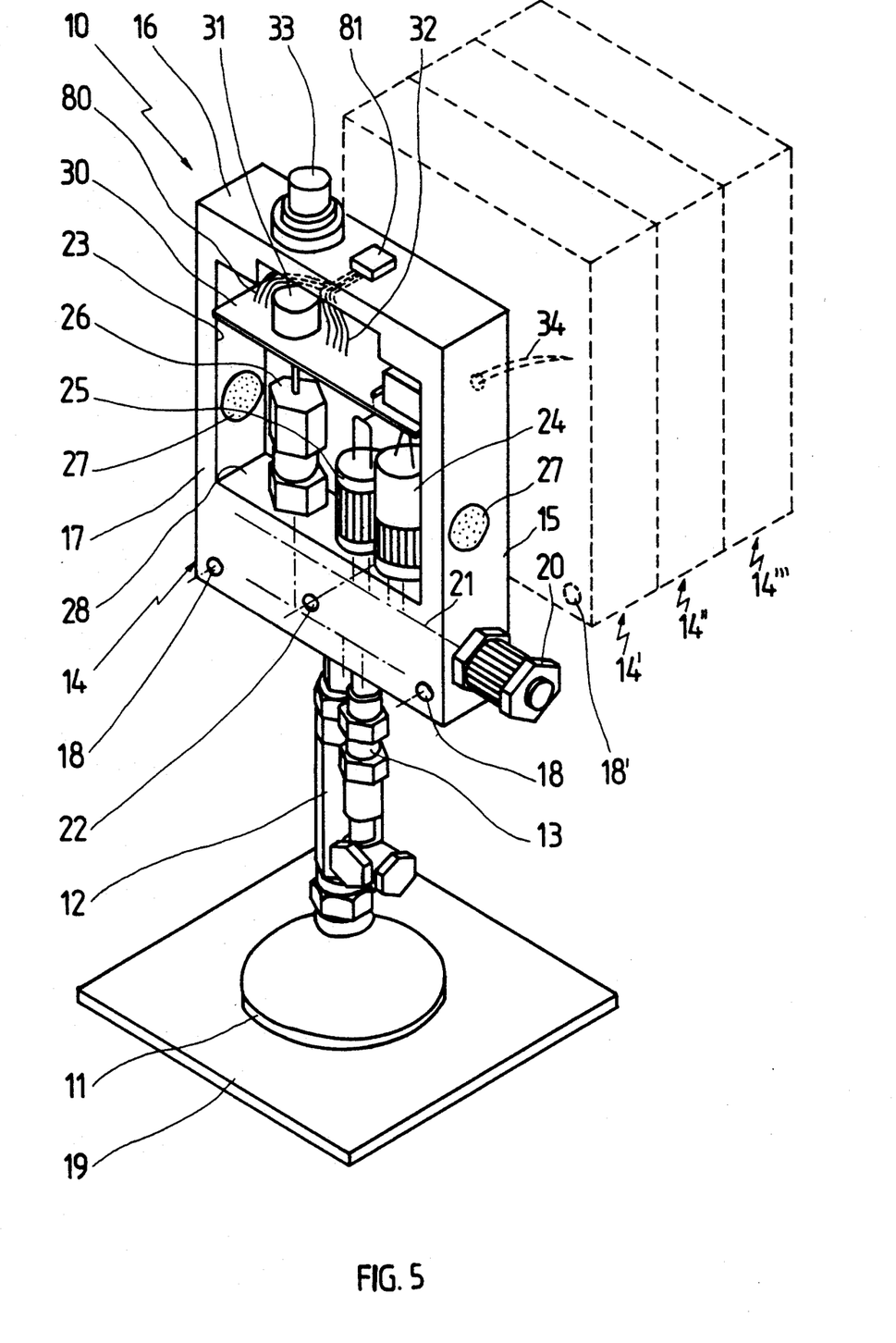
FIG. 5 is a perspective view of an exemplified embodiment, similar to FIG. 1, including printed-circuit board conduits and luminescent diodes.
Figure 6:
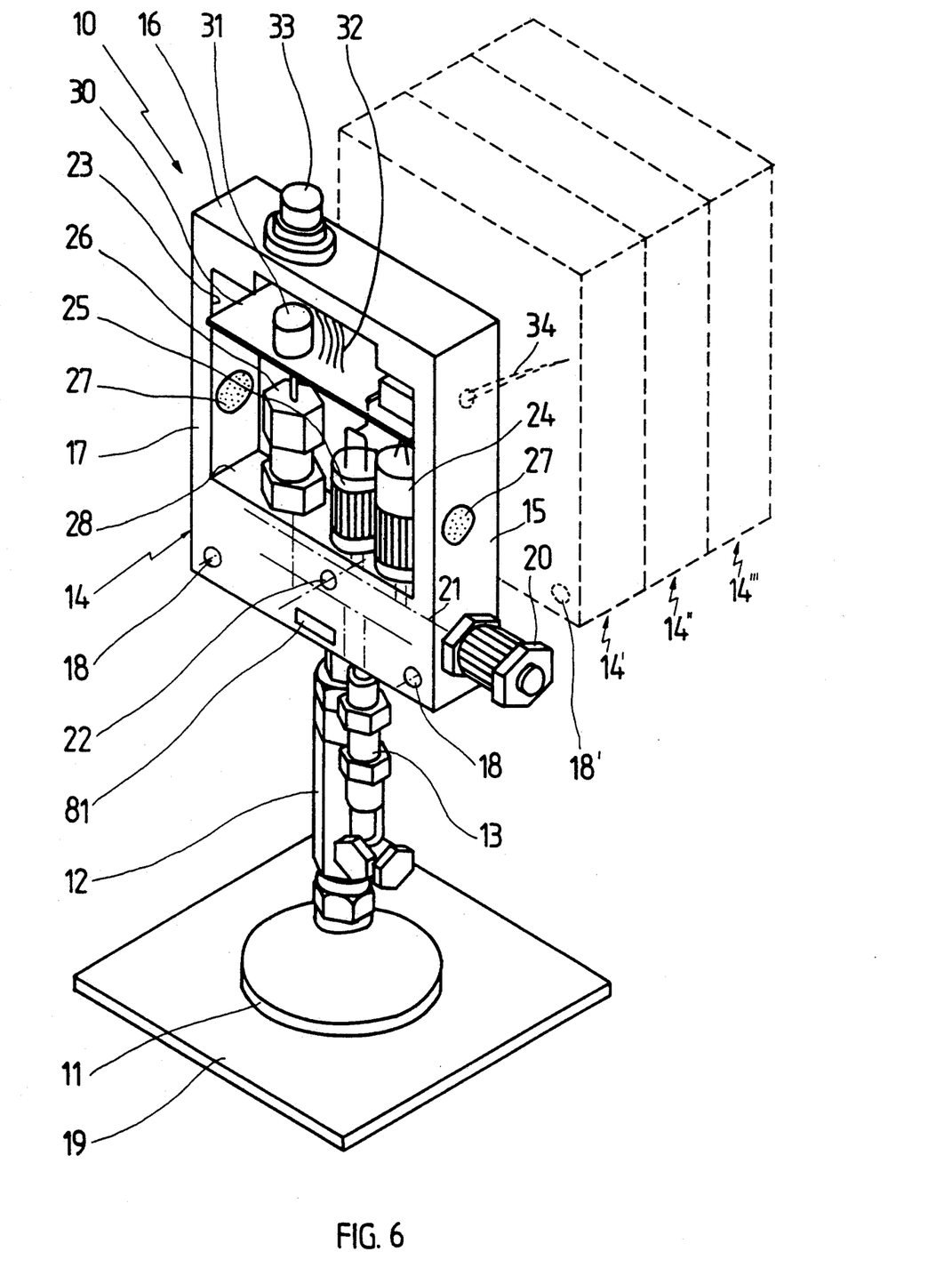

A printed circuit board 30 is disposed in the upper part of the window-like breakout section 23. The printed circuit board 30 is slid into lateral grooves of the window-like breakout section 23. The printed circuit board 30 carries the electronic device components 31, for example, preamplifiers, threshold stages, driver stages, and the like, and is connected via a flat-band cable 32 with the electrical plug connector 33. The printed circuit board 30 can furthermore be connected via conduits 80, with luminescent diodes 81, as illustrated in FIG. 5. The luminescent diodes 81 can, for example, be disposed at the upper narrow side 16 in order to optically display the operating states of the negative-pressure battery 10.

Figure 2:
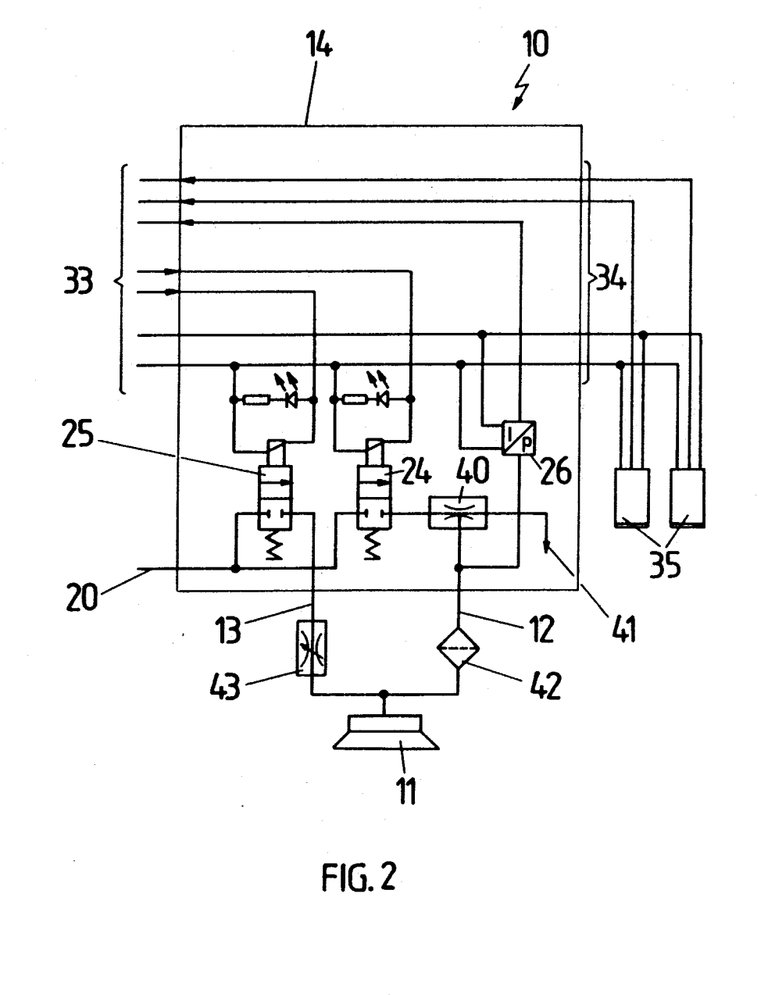
FIG. 2 is a schematic of a first embodiment of an electrical/pneumatic circuit diagram for the manipulator according to FIG. 1.

Furthermore, a connector 34, formed as a cable, can be furnished at a lateral narrow side 15. The connector 34 leads to proximity switches 35, as indicated in FIG. 2. The proximity switches 35 can perform limiting functions, by way of which, for example, a collision of device elements of the manipulating device is avoided.

FIG. 2 illustrates a first exemplified embodiment for an electrical and pneumatic circuit diagram of a negative-pressure battery 10.

The connectors combined in the electrical plug connector 33 in a current interface position comprise, according to the embodiment of FIG. 2, a total of seven conduits. These conduits are connected via a corresponding cable to a memory-storage programmable control (SPC). The upper three conduits in this case furnish output signals of the proximity switch 35 as well as of the pressure sensor 26. The signal of the pressure sensor 26, for example, can run between level values of 4 and 20 mA. The center two conduits are coordinated to the outputs of the memory-storage programmable control (SPC) and serve for controlling the valves 24 and 25. The lower two conduits are supply conduits and carry for example a direct current of 24 volts.

The joint compressed-air connector 20 runs to the 2/2-way solenoid valves 24 and 25 in the pneumatic part of FIG. 2. The solenoid valves 24 and 25 can be actuated via the memory-storage programmable control (SPC).

The solenoid valve 24 allows to switch the joint compressed-air connector 20 to an input of a Venturi nozzle 40. The output of the Venturi nozzle 40 is connected to a pressure discharge port 41. The negative pressure building up in the Venturi nozzle 40 is picked up at the first, rigid conduit 12 and passed via a filter 42 to the suction gripper 11. The filter 42 can be integrated into the first, rigid conduit 12. In this way, the desired negative pressure can be generated based on the power of an overpressure present in the casing 14.

The second solenoid valve 25 is also a 2/2-way valve and allows to connect the central compressed-air connector 20 via a throttle 43 also to the suction gripper 11. This is performed if the workpiece 19 is to be blown off from the suction gripper 11 and if an accelerated release is thereby to be obtained.

The negative pressure in the first, rigid conduit 12 is captured and recorded via the pressure sensor 26. The output signal of the pressure sensor 26 is fed to the input of the memory-storage programmable control (SPC). It can be easily recognized that, in cases where an interference occurs at the suction gripper 11, no sufficient negative pressure can be built up in the second flexible conduit 13 and this will be recognized via the pressure sensor 26 and will be signalled to the memory-storage programmable control (SPC). A corresponding situation is present if, in an individual case, an excessive level value of a negative pressure should become effective, which can for example have the result that a suctioned paper sheet becomes crumpled and creased. For example, a threshold switch can be disposed in the memory-storage programmable control (SPC), where the threshold switch generates an alarm signal upon observation of a defined preset limiting value.

On the other hand, it is possible to allow the pressure sensor 26 to cooperate with an automatic controller in the memory-storage programmable control (SPC). Said automatic controller sets the pressure at the compressed-air connector 20 in a corresponding way such that a constant negative pressure always prevails in the first, rigid conduit 12 independent of the working conditions present at the suction gripper 11.

A further possibility for setting an automatically controlled negative pressure comprises that a built-in servo valve, for example a pressure servo valve, is employed. The pressure servo valve can be electrically controlled via the joint plug connector 33. It is possible with the pressure servo valve to provide electrically different negative pressures from a surveillance and control circuit.

The ventilation stream can be metered by way of the throttle 43 in case of a blowing off of the workpiece 19. The throttle 43 can be integrated into the second, flexible conduit 13. Alternatively, the throttle 43 can also be disposed in the casing 14, such as the filter 42.

The embodiment illustrated in FIG. 3 includes the same reference numerals as FIGS. 1 and 2, however, the adjunct "a" was added for allowing specific referencing.

The embodiment of FIG. 3 is distinguished from that of FIG. 2 in that the negative pressure for the first, rigid conduit 12a is no longer generated in the casing 14a itself but in that this negative pressure is externally generated. A negative-pressure connector 50 serves for this purpose. This negative-pressure connector 50 can of course be integrated into the integrated channel system of the negative-pressure battery 10. The negative-pressure connector 50 is led to the 2/2-way solenoid valve 24a, in order to be able to apply the negative pressure by way of the first, rigid conduit 12a. The central compressed-air connector 20a, together with the second 2/2-way solenoid valve 25a, now serves in this case only for blowing off the workpiece.

Figure 4:
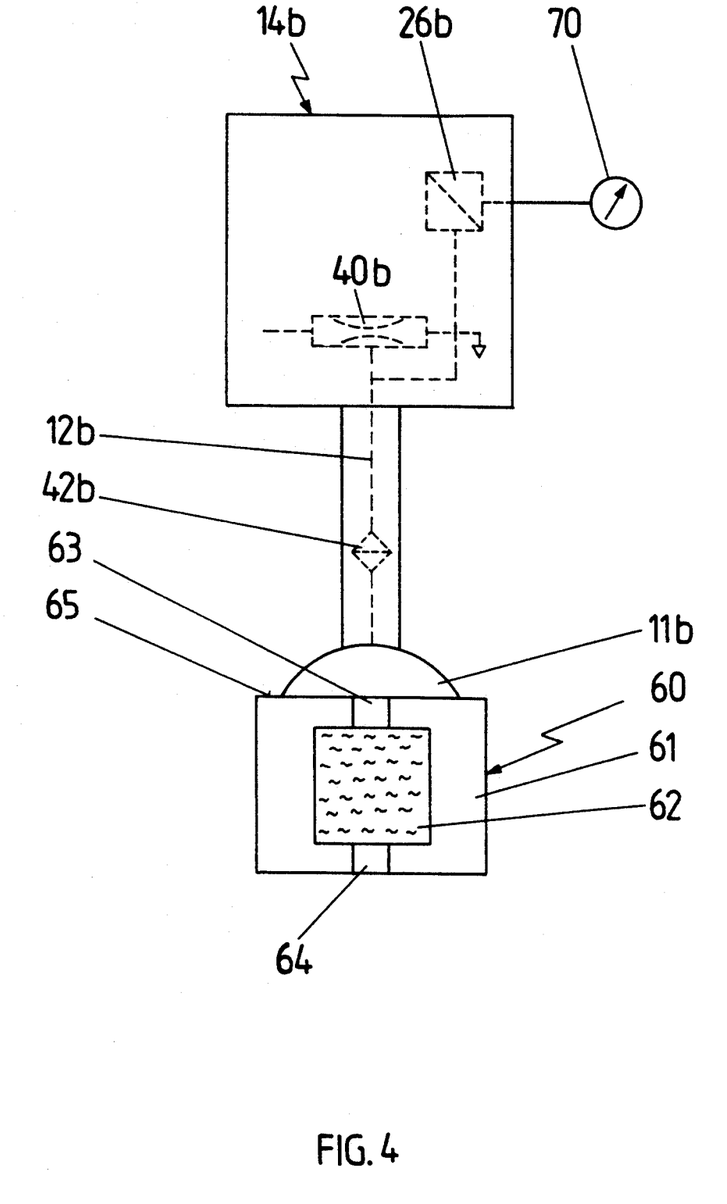
FIG. 4 is a schematic side elevational view of the manipulator according to FIG. 1 during the performance of the invention method.

According to the representation illustrated in FIG. 4, the same reference numerals are employed as previously, however, the characterizing adjunct "b" is added to the corresponding reference numeral.

FIG. 4 makes reference by way of example to the embodiment of FIG. 2 which, however, is only to be considered as an example.

According to FIG. 4, the suction gripper 11b grips a fluid-passing component, in particular an air filter 60.

The air filter 60 comprises a casing 61 with a filter insert 62. A first opening 63 leads to one side of the filter insert 62 and a second opening 64 leads to the opposite side of the filter insert 62.

If the suction gripper 11b is now placed onto the surface 65 of the air filter 60, where the first opening 63 is disposed, then there is generated a defined leakage air current. This leakage air current is effected by the negative pressure applied below the suction gripper 11b and pulls air through the second opening 64, the filter insert 62, as well as the first opening 63. This leakage air current leads to a defined pressure rise in the first, rigid conduit 12b. This pressure rise is captured and measured in the pressure sensor 26b, as already recited, and can be displayed at a measurement device 70.

If the suction gripper 11b now grips a flawless filter 60, then the arrangement can be performed such that, despite the defined leakage current, a safe handling of the filter 60 is possible by way of negative pressure. The measurement device 70 will in this case display a predetermined permissible pressure rise in the first, rigid conduit 12b.

However, if the suction gripper 11b now grips a defective filter 60, in which for example a filter insert 62 is missing, then the air passage through the filter 60 encounters such a low resistance, that a sufficient negative pressure cannot build up in the first, rigid conduit 12b. This is displayed at the measurement device 70, possibly via a coordinated alarm switch, in order to signal thereby that not only can a safe transport of the filter not be assured but that, in addition, the filter 60 itself is defective.

A further circuit can be provided which allows the manipulator to separate the defective filter from the acceptable filters and furnishes the defective filter to a waste discharge bin.

It will be understood that each of the elements described above, or two or more together, may also find a useful application in other types of manipulating devices differing from the types described above.

While the invention has been illustrated and described as embodied in the context of a manipulator with a suction gripper and a method for handling and testing fluid-passing components, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A manipulating device for gripping workpieces with a negative pressure, comprising:
   a suction gripper;
   a rectangular casing connected to the suction gripper and including a broad side providing a first broad face of the casing and a second broad face of the casing;
   a means for generating and feeding a negative pressure disposed in the casing;
   at least one valve disposed in the casing and connected to the means for generating and feeding a negative pressure, wherein the suction gripper is subjected to the negative pressure by means of the valve;
   an integrated channel system disposed in the casing and substantially aligned in a plane parallel to the broad side and including a port;
   a distribution channel branching off from the channel system, wherein the distribution channel is connected to the means for generating and feeding a negative pressure, wherein the casing is connectable at the first broad face and at the second broad face to a broad face of a like casing such that the distribution channel is led to the broad side of the casing and the casing is capable of being assembled with additional casings of a like structure and including a channel system with a distribution channel to form a valve battery of casings, wherein the distribution channels of the casings abut and join together at abutting respective broad faces, and wherein the integrated channel systems thereby communicate with each other.

2. The manipulating device according to claim 1, further comprising
   a second valve for controlling air fed back from the suction gripper;
   an opening at the casing, wherein the valves are disposed in the opening of the casing.

3. The manipulating device according to claim 1, further comprising
   means for adjusting the negative pressure.

4. The manipulating device according to claim 1, further comprising
   a pressure sensor in the casing;
   a rigid conduit carrying the negative pressure and leading to the suction gripper, wherein the pressure sensor is 5. The manipulating device according to claim 4, further comprising
   an automatic controller connected to the valve for adjusting the negative pressure, wherein the pressure sensor is connected to the automatic controller.

6. The manipulating device according to claim 1, wherein
   the valve, by way of which the suction gripper is subjected to a negative pressure, is a servo valve.

7. The manipulating device according to claim 1, further comprising means for adjusting negative pressure including a Venturi nozzle including a pressure connection and a suction connection and disposed in the casing, wherein the pressure connection is connected to a source of compressed air via the valve, and wherein the suction connection of the Venturi nozzle is connected to the suction gripper.

8. The manipulating device according to claim 1, further comprising a negative-pressure connector, wherein the negative-pressure connector is disposed at the casing and is connected via the valve to the suction gripper.

9. A manipulating device with a suction gripper (11) for a gripping of workpieces (19) with negative pressure, where a means for generating a negative pressure and at least one valve (24) are disposed in a casing connected to the suction gripper (11), wherein the suction gripper (11) is subjected to the negative pressure by means of the valve (24), wherein the casing (14) is of a rectangular form and includes an integrated channel system (21), wherein the channel system (21) connects to a distribution channel (22), which distribution channel (22) is led to a broad side (17) of the casing (14) such that the casing (14) together with additional casings (14, 14', 14'', 14''') of a like structure and having a corresponding channel system with corresponding distribution channels are capable of being assembled to form a valve battery of casings, wherein he distribution channels (22) of the casing (14, 14', 14'', 14''') and neighboring additional casings abut and join together, and wherein the channel systems (21) thereby communicate with each other.

10. The manipulating device according to claim 9, wherein the casing (14) has an opening (23), and wherein the valve (24) and a second valve (25) are disposed in the opening (23).

11. The manipulating device according to claim 9, further comprising means for adjusting a negative pressure.

12. The manipulating device according to claim 9, wherein the casing (14) comprises a pressure sensor (26), which pressure sensor (26) is connected to a rigid conduit (12), carrying the negative pressure and leading to the suction gripper (11).

13. The manipulating device according to claim 12, wherein the pressure sensor (26) is connected to an automatic controller for a setting of the negative pressure and to a suction valve.

14. The manipulating device according to claim 9, wherein the valve, by way of which the suction gripper is subjected to a negative pressure, is a servo valve.

15. The manipulating device according to claim 9, wherein the casing (14) comprises a Venturi nozzle (40), wherein a pressure connection of the Venturi nozzle (40) is connectable to the distribution channel (22) subjected to a compressed air via the valve (24), and wherein a suction connection of the Venturi nozzle (40) is connected to the suction gripper (11).

16. The manipulating device according to claim 9, wherein the casing (14a) includes a negative-pressure connector (50), where the negative-pressure connector (50) is connected via a valve (24a) to the suction gripper (11).

17. A manipulating device with a suction gripper (11) for a gripping of workpieces (19) with negative pressure, where a means for feeding a negative pressure and at least one valve (24) are disposed in a casing connected to the suction gripper (11), wherein the suction gripper (11) is subjected to the negative pressure by means of the valve (24), wherein the casing (14) is of a rectangular form and comprises an integrated channel system (21), wherein the channel system (21) connects to a distribution channel (22), which distribution channel (22) is led to a broad side (17) of the casing (14) such that the casing (14) together with additional casings (14, 14', 14'', 14''') of a like structure are capable of being assembled to form a valve body of casings, wherein the distribution channel (22) of the casing (14, 14', 14'', 14''') abuts and joins together with a distribution channel of one of the additional casings of a like structure, and wherein the channel (21) in the casing thereby communicates with a distribution channel of a neighboring like structure.

18. A manipulating device for gripper workpieces with a negative pressure, comprising a casing having a first flat face and having a second flat face disposed parallel and opposed to the first flat face;

a port disposed on the casing for connecting a gas line;

a channel system connected to the port and disposed in the casing;

a distribution channel connected to the channel system;

a first face port disposed on the first flat face of the casing and connected to the distribution channel;

a second face port disposed on the second flat face and connected to the distribution channel;

a first valve connected to the channel system and having an output;

a suction gripper activation port disposed on the casing and connected to the output of the first valve, wherein the casing is constructed such that like casings can be attached with their respective flat faces to the flat faces of the casing such that the respective face ports of the casing are connected to corresponding face ports of like casings such that the distribution channels of the casing and of corresponding like casings abut and join together.

19. The manipulating device for gripping workpieces with a negative pressure according to claim 18 further comprising a suction gripper connected to the suction gripper activation port.

20. The manipulating device for gripping workpieces with a negative pressure according to claim 18 further comprising means for generating and feeding a negative pressure connected to the first valve and to the suction gripper activation port for providing a negative pressure to the suction gripper activation port;

a suction gripper discharge port disposed at the casing for receiving waste gas from a suction gripper;

a second valve connected to the suction gripper discharge port.

21. The manipulating device for gripping workpieces with a negative pressure according to claim 20 wherein the suction gripper is connected to the suction gripper activation port and to the suction gripper discharge port.

22. The manipulating device for gripping workpieces with a negative pressure according to claim 20 further comprising
   a filter disposed in the casing between the means for generating and feeding a negative pressure and the suction gripper;
   a throttle disposed between the second valve and the suction gripper;
   a pressure sensor disposed in the casing and connected to the suction gripper activation port for sensing the pressure present at the suction gripper activation port;
   a control circuit disposed in the casing and connected to the first valve for activating the first valve, connected to the second valve for activating the second valve and connected to the sensor for receiving signals corresponding to the pressure substantially present at the suction gripper activation port.

23. The manipulating device for gripping workpieces with a negative pressure according to claim 20 further comprising
   a source of compressed air connected to the port disposed on the casing, wherein the means for generating and feeding a negative pressure is provided by a Venturi nozzle having a pressure connection and a suction connection and disposed in the casing, wherein the pressure connection is connected to the first valve, and wherein the suction connection of the Venturi nozzle is connected to the suction gripper activation port.

24. The manipulating device for gripping workpieces with a negative pressure according to claim 18 wherein the port is a negative pressure connection port disposed at the casing and connected to a means for generating and feeding a negative pressure connected to the first valve and to the suction gripper activation port for providing a negative pressure to the suction gripper activation port;
   a suction gripper discharge port disposed at the casing for receiving waste gas from the suction gripper;
   a second valve connected to the suction gripper discharge port.

25. The manipulating device for gripping workpieces with a negative pressure according to claim 24 further comprising
   a suction gripper connected to the suction gripper activation port and to the suction gripper discharge port.

26. The manipulating device for gripping workpieces with a negative pressure according to claim 24 further comprising
   a filter disposed in the casing between the means for generating and feeding a negative pressure and the suction gripper activation port;
   a throttle disposed between the second valve and the suction gripper discharge port;
   a pressure sensor disposed in the casing and connected to the suction gripper activation port for sensing the pressure present at the suction gripper activation port;
   a control circuit disposed in the casing and connected to the first valve for activating the first valve, connected to the second valve for activating the second valve and connected to the sensor for receiving signals corresponding to the pressure substantially present at the suction gripper activation port.

27. The manipulating device for gripping workpieces with a negative pressure according to claim 18 further comprising
   a second port disposed on the casing and connected to a second valve;
   a source of compressed air connected to the second port disposed on the casing, wherein means for generating and feeding a negative pressure is provided by a Venturi nozzle having a pressure connection and a suction connection and disposed in the casing, wherein the pressure connection is connected to the first valve, and wherein the suction connection of the Venturi nozzle is connected to the suction gripper activation port.

28. The manipulation device for gripping workpieces with a negative pressure according to claim 18 further comprising
   a pressure sensor connected to the suction gripper activation port;
   a measurement device connected to the pressure sensor for displaying the pressure present at the suction gripper activation port;
   a proximity switch connected to the casing;
   a control circuit disposed in the casing and connected to the first valve for activating the first valve, connected to the proximity switch and connected to the sensor for receiving signals corresponding to the pressure substantially present at the suction gripper activation port;
   a narrow side disposed at the casing;
   a sound absorber disposed in an opening of the narrow side of the casing;
   a luminescent diode formed on the narrow side of the casing and connected to the control circuit for optically displaying operating states of the negative-pressure at the suction gripper actuation port.

* * * * *